United States Patent
Rodrigo Cavalin et al.

(10) Patent No.: US 12,367,308 B2
(45) Date of Patent: Jul. 22, 2025

(54) DOMAIN ADAPTATION-BASED DISGUISING OF PROMPTS FOR DATA PRIVACY IN FOUNDATION MODELS

(71) Applicant: International Business Machines Corporation, Armonk, NY (US)

(72) Inventors: Paulo Rodrigo Cavalin, Rio de Janeiro (BR); Julio Nogima, São Paulo (BR); Pedro Henrique Domingues, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 18/214,814

(22) Filed: Jun. 27, 2023

(65) Prior Publication Data
US 2025/0005182 A1    Jan. 2, 2025

(51) Int. Cl.
G06F 21/62    (2013.01)

(52) U.S. Cl.
CPC ............................... *G06F 21/6218* (2013.01)

(58) Field of Classification Search
CPC ............. G06F 21/6218; G06F 21/6227; G06F 21/6245; G06F 21/6264; G06F 21/62
See application file for complete search history.

(56) References Cited

U.S. PATENT DOCUMENTS

| | | | |
|---|---|---|---|
| 7,765,310 B2 | 7/2010 | Graveline et al. | |
| 8,140,502 B2 | 3/2012 | Francis et al. | |
| 10,181,049 B1 | 1/2019 | El Defrawy et al. | |
| 10,268,834 B2 | 4/2019 | Pourzandi et al. | |
| 10,346,627 B2 | 7/2019 | Kaliski, Jr. | |
| 10,810,313 B2 | 10/2020 | Cannings et al. | |
| 11,139,958 B2 | 10/2021 | Smith et al. | |

(Continued)

FOREIGN PATENT DOCUMENTS

| KR | 102432003 B1 | 8/2022 |
|---|---|---|
| WO | 2022/078021 A1 | 4/2022 |

OTHER PUBLICATIONS

Zhao, et al., "Learning Domain Invariant Prompt for Vision-Language Models," arXiv:2212.04196v2 [cs.CV] Mar. 31, 2023.

(Continued)

*Primary Examiner* — Quazi Farooqui
(74) *Attorney, Agent, or Firm* — Anthony Pallone

(57) ABSTRACT

A privacy-preserving method of accessing a model as a service (e.g., a language model) receives an input prompt authored in a first domain having data intended to be maintained private. In response, and using a conversion model, the input prompt authored in the first domain is converted to a second domain to create a converted input prompt. The converted input prompt preserves a semantic context of the input prompt. The converted input prompt is then delivered to the model as a service, which returns a response in the second domain. Using the conversion model, the response is then converted back into the first domain to create a converted response. The converted response has the semantic context of the input prompt. The converted response is provided as a reply to the input prompt. The conversion model may be trained using data collected from user interactions with the model as a service.

20 Claims, 6 Drawing Sheets

(56) References Cited

U.S. PATENT DOCUMENTS

| | | | |
|---|---|---|---|
| 2017/0372226 A1 | 12/2017 | Costa et al. | |
| 2022/0391768 A1 | 12/2022 | Li et al. | |
| 2024/0402801 A1* | 12/2024 | Shutzberg | G06F 3/04842 |
| 2024/0430233 A1* | 12/2024 | Tanner | H04L 63/0245 |

OTHER PUBLICATIONS

Zhao, et al. "FedPrompt: Communication-Efficient and Privacy-Preserving Prompt Tuning in Federated Learning," arXiv:2208.12268v3 [cs.LG] Jan. 24, 2023.
Sun, et al., "Black-Box Tuning for Language-Model-as-a-Service," arXiv:2201.03514v4 [cs.CL] Jun. 27, 2022.
Chen, et al., "AdaPrompt: Adaptive Model Training for Prompt-based NLP," arXiv:2202.04824v2 [cs.CL] Nov. 18, 2022.
Huang, et al., "TextHide: Tackling Data Privacy in Language Understanding Tasks," EMNLP 2020, pp. 1368-1382 Nov. 16, 2020.
Han, et al., "Privacy-Preserving Multi-Source Domain Adaptation for Medical Data," IEEE Journal of Biomedical and Health Informatics, May 2022.
An, el al., "A Privacy-Preserving Unsupervised Domain Adaptation Framework for Clinical Text Analysis," arXiv:2201.07317v1 [cs.CL] Jan. 18, 2022.
Cavalin, et al., "From Disjoint Sets to Parallel Data To Train SeqZSeq Models For Sentiment Transfer," EMNLP 2020, pp. 689-698, Nov. 16, 2020.
Vaswani, et al., "Attention is All You Need," 31st Conference on Neural Information Processing Systems (NIPS 2017).
"Prompt papers", retrieved from web https://github.com/thunlp/PromptPapers, Mar. 2023, 15 pages.
David et al, "PADA: Example-based Prompt Learning for on-the-fly Adaptation to Unseen Domains", Transactions of the Association for Computational Linguistics, Apr. 11, 2022, pp. 414-433, https://direct.mit.edu/tacl/article/doi/10.1162/tacl_a_00468/110538/PADA-Example-based-Prompt-Learning-for-on-the-fly.
Dowlin et al. "CryptoNets: Applying Neural Networks to Encrypted Data with High Throughput and Accuracy", Proceedings of Machine Learning Research, 2016, 12 pages, https://proceedings.mlr.press/v48/gilad-bachrach16.pdf.

* cited by examiner

FIG. 5

DOMAIN ADAPTATION-BASED DISGUISING OF PROMPTS FOR DATA PRIVACY IN FOUNDATION MODELS

BACKGROUND OF THE INVENTION

Technical Field

This disclosure relates generally to preserving data privacy in a machine learning as-a-service operating environment.

Background of the Related Art

Systems that execute specific tasks in a single domain are giving way to broad Artificial Intelligence (AI) that learns more generally and works across domains and problems. Foundation models, trained on large, unlabeled datasets and fine-tuned for an array of applications, are driving this shift. The most common foundation models are the Large Language Models (LLM) (e.g. BERT, GPT-3, and others), which are powerful tools and are becoming popular as they find their way into many Natural Language Processing (NLP) applications. As more LLMs are deployed as a service offering, however, the issue of privacy becomes significant. In particular, the request to these services may carry data that are private but need to be conveyed somehow to benefit from the service. This matter becomes more sensitive considering that the submitted data can be captured and used further to train the model itself. One way to solve this problem is to encrypt the request. Any such approach, however, requires a service to decrypt the request, which is not feasible absent internal access to the service. Other possible solutions (e.g., the use of homomorphic encryption) also requires customization or re-training of the language model.

In a Foundation Model as a service (FMaaS) context, there remains a need to find a way to transform a prompt so that the original content (e.g., textual data and instruction) cannot be discovered.

BRIEF SUMMARY

This disclosure provides for a method, apparatus and computer program product that addresses the problem of how to use model as a service-related services, e.g., example for an NLP task such as sentiment analysis, intent analysis, question-answering, without exposing the original request content to the service for privacy purposes. To this end, and according to this disclosure, a privacy-preserving method of accessing a model as a service (e.g., a language model) begins by receiving an input prompt authored in a first domain, the first domain including data intended to be maintained private. In response to receipt of the input prompt, and using a language conversion model that is distinct from the language model as a service, the input prompt authored in the first domain is converted to a second domain to create a converted input prompt. The converted input prompt preserves a semantic context of the input prompt. Then, and in lieu of providing the input prompt authored in the first domain to the language model as a service, the converted input prompt is delivered to the model as a service, which then returns a response to the converted input prompt. The response is in the second domain. In response to receipt of the response, and using the language conversion model, the response is then converted back into the first domain to create a converted response. The converted response has the semantic context of the input prompt and thus may include the private data. The converted response is then provided as a reply to the input prompt. In this approach, preferably the language conversion model is trained using data collected from user interactions with the language model as a service, and the second domain may be one of several domains that, based on a semantic similarity measure, is selected to pair with the first domain.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 5 depicts an exemplary implementation of the technique of this disclosure in the context of a large language model, such as Open AI® Chat GPT-3.

DETAILED DESCRIPTION OF AN ILLUSTRATIVE EMBODIMENT

Figure 1:
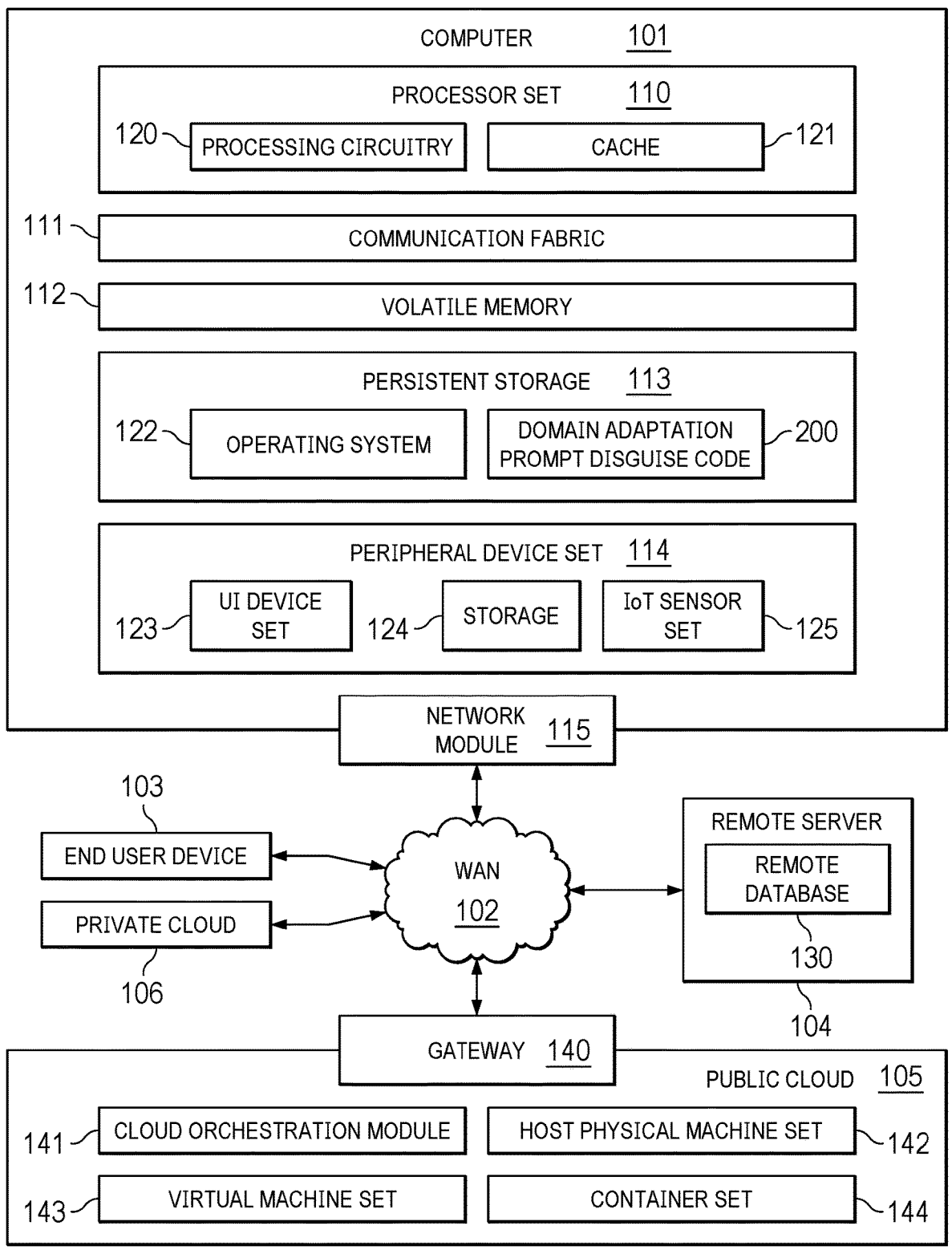
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the domain adaptation-based prompt disguise code 200 of this disclosure. In addition to block 200, computing environment 100 includes, for example, computer 101, wide area network (WAN) 102, end user device (EUD) 103, remote server 102, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 112 (including user interface (UI) device set 123, storage 122, and Internet of Things (IoT) sensor set 125), and network module 115. Remote server 102 includes remote database 130. Public cloud 105 includes gateway 120, cloud orchestration module 121, host physical machine set 122, virtual machine set 123, and container set 122.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 112 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 122 is external storage, such as an external hard drive, or insertable storage, such as an SD card. Storage 122 may be persistent and/or volatile. In some embodiments, storage 122 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 102 is any computer system that serves at least some data and/or functionality to computer 101. Remote server 102 may be controlled and used by the same entity that operates computer 101. Remote server 102 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 102.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 121. The computing resources provided by public cloud 105 are typically implemented by virtual computing environments that run on various computers making up the computers of host physical machine set 122, which is the universe of physical computers in and/or available to public cloud 105. The virtual computing environments (VCEs) typically take the form of virtual machines from virtual machine set 123 and/or containers from container set 122. It is understood that these VCEs may be stored as images and may be transferred among and between the various physical machine hosts, either as images or after instantiation of the VCE. Cloud orchestration module 121 manages the transfer and storage of images, deploys new instantiations of VCEs and manages active instantiations of VCE deployments. Gateway 120 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Prompt-Based Foundation Model as a Service (FMaaS)

As noted above, a next wave in AI is a movement toward replacing task-specific models trained on well-labeled datasets with general models that are trained on a broad set of unlabeled data and that can be used for different tasks, with minimal fine-tuning. These are so-called foundation models. Early examples of natural language-based models, like GPT-3, and BERT, have shown what is possible in this approach. For example, with just a short prompt as input, the system generates an entire essay based on parameters, despite the fact that the model is not specifically trained on how to execute the exact argument. What makes these new systems foundation models is that they can be the foundation for many applications of the AI model. Using self-supervised learning and transfer learning, the model can apply information it has learnt about one situation to another.

Figure 2:
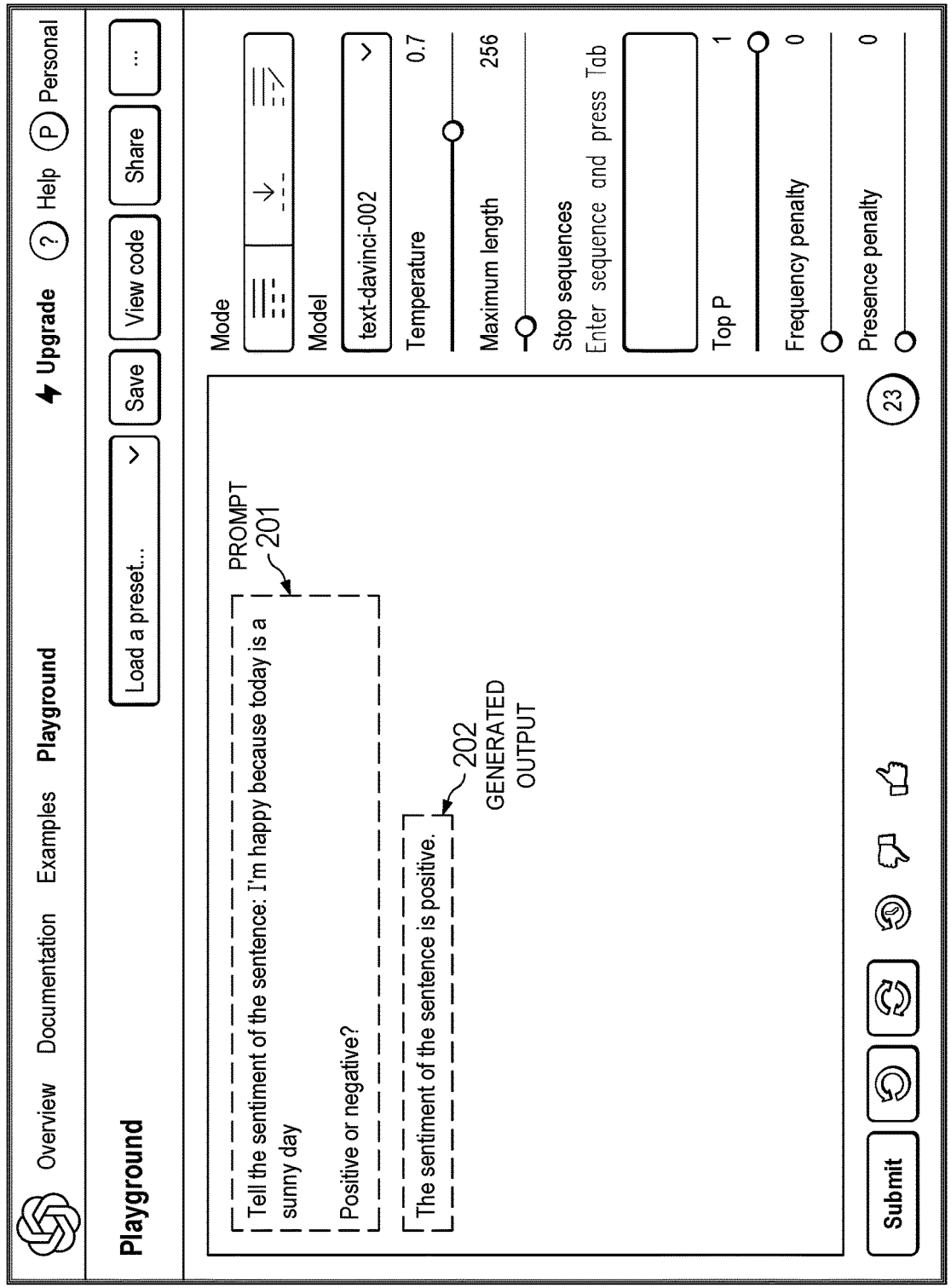
FIG. 2 depicts a representative prompt to a LLM executing as a FMaaS, also showing a generated response.

Because Foundation Models are too large for distribution, typically they are accessed via Application Programming Interface (API). Prompting (or prompt programming) is a way to 'program' the model for a given task. Typically, a prompt comprises instructions, together with data. FIG. 2 depicts a representative FMaaS interface, in this example a simple web page. Here, the model is being programmed to provide a Natural Language Processing (NLP) sentiment analysis using the prompt "Tell the sentiment of the sentence: 'I'm happy because today is a sunny day' Positive or negative?" 201. Given these instructions and data, the model returns a generated output 202, namely, "The sentiment of the sentence is positive." An accurate and appropriate output thus is provided without having trained the language model on well-labeled training data. While a generative AI language model of this type thus provides significant advantages, it is difficult to ensure privacy with prompting. When data is used in the prompt, the domain of the application (in this example, sentiment analysis) is exposed, and the client may become a target for malicious attacks. While encryption can be used to preserve privacy, such a solution requires local models and interaction with the model provider. Other techniques to preserve privacy, such as masking and shuffling, have the potential to harm prompt quality, making it difficult for the model to understand the data's content and thus adversely affecting accuracy of the generated output.

Figure 3:
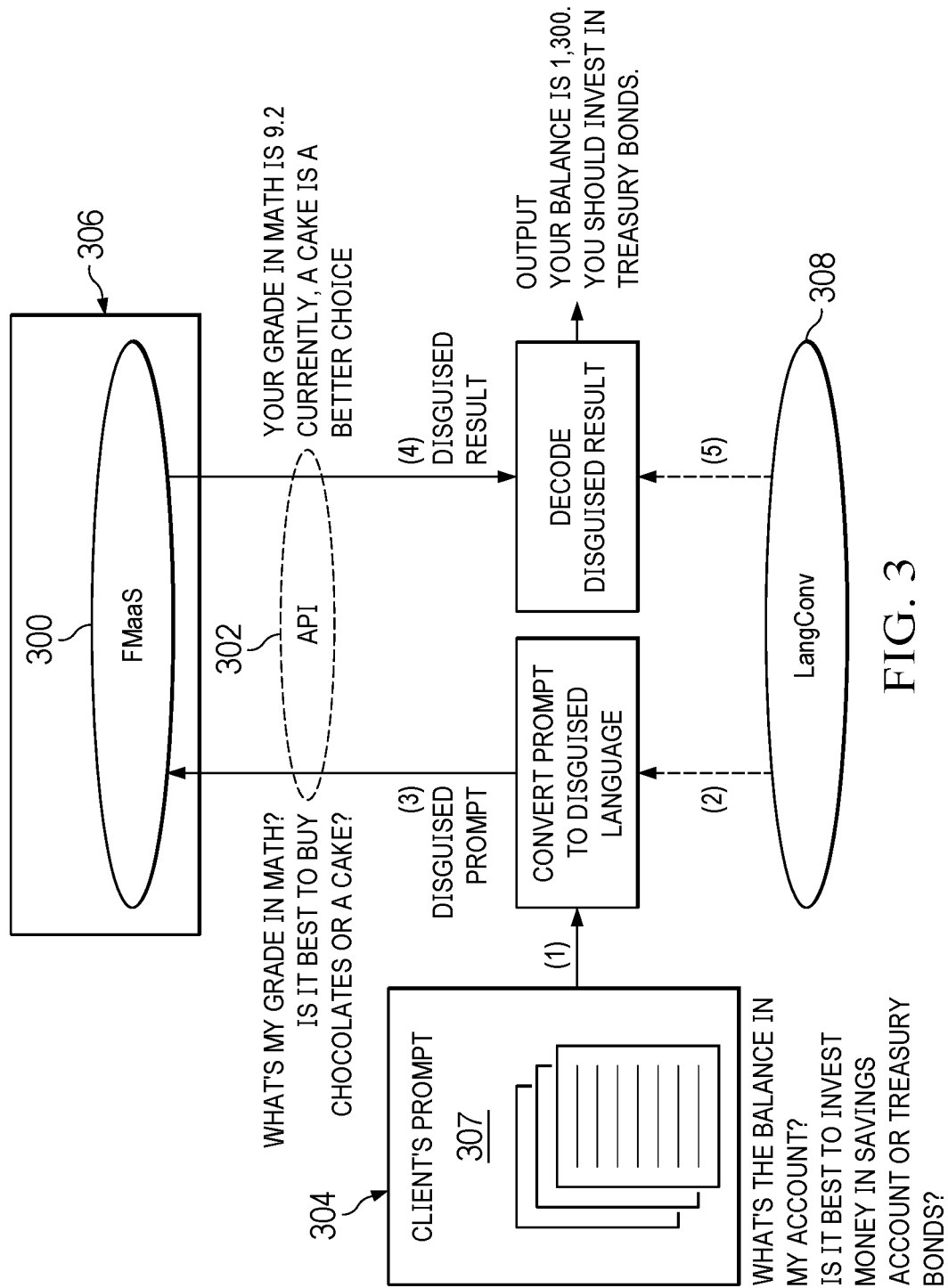
FIG. 3 depicts the high level architecture of this disclosure wherein a language conversion model is provided in association with a FMaaS to ensure privacy of client data in a prompt.

Domain Adaptation-Based Disguising of Prompts for Data Privacy in Foundation Models With the above as background, the techniques of this disclosure are now described in the context of FMaaS 300 of FIG. 3, which is accessed over API 302 by a client 304. In a representative embodiment, the FMaaS 300 executes as a network-addressable (e.g., URI-) endpoint (a WebAPI) on a network-accessible server 306, and the client accesses the endpoint using a conventional web browser or mobile app (or native application), typically via an HTTP- or HTTPS-based request-response workflow. The client and server may be implemented as a computing system, such as described above and depicted in FIG. 1. This implementation is not intended to be limiting. In this approach, and instead of applying the prompt in the clear and directly to the FMaaS 300, the client's prompt 307 is first converted into a "disguised" prompt using a language conversion model architecture (e.g., LangConv) 308, and it is the disguised prompt that is then sent to the FMaaS 300 for evaluation by the generative AI model. Preferably, and as will be described in more detail below, the language conversion model 308 is a transformer-based architecture that, in lieu of using just recurrence, instead relies on an attention mechanism to identify dependencies between an input and an output.

Referring back to FIG. 3, the output generated from the FMaaS 300 is then decoded through the language conversion model to recover the actual response to the client's prompt. Thus, the solution herein utilizes the language conversion model to provide a domain adaptation-based disguising of the client prompt. Stated another way, the approach disguises the prompt before sending it to the FMaaS provider, and un-disguises the generative AI response to recover the true generated output. By disguising the client prompt (and generative AI response) in this manner, privacy is preserved, yet (as will be described) the accuracy and reliability of the underlying generative AI are maintained.

With specific reference to several examples shown in FIG. 3, the workflow proceeds as follows. The examples are non-limiting. At step (1), the system takes the client's prompt 307 as input. In this example, a first original client prompt is "what's the balance in my account?" or "it is best to invest money in a savings account or a treasury bond?" At step (2), the language conversion model 308 converts the original prompt to the disguised prompt, with these particular examples results in the disguised prompts: "what's my grade in math?" or "it is best to buy chocolates or a cake?" Note that the example disguised prompts here are in the same language as the original prompts such that a person who speaks the language of the data can read them but is not able to understand what is in the original data. At step (3), the disguised prompt is input to the FMaaS 300, which then returns the generated output at step (4). With these example disguised prompts, the generative AI model returns "your grade in math is 9.2" or "currently, a cake is a better choice." At step (5), the disguised result is then re-applied to the language conversion model 308, which decodes the result into the true generated output. Continuing with these examples, the true (private) generated output is "your balance is $1,300" or "you should invest in treasury bonds." This completes the processing In FIG. 3, the workflow depicted is carried out during an inferencing phase using the language conversion model that is already trained, preferably on a client's data corpus, as will be explained below. As can be appreciated, any malicious or other impermissible access to the disguised request provided to the FMaaS provider or to the disguised response from the generative AI does not reveal the actual prompt or the actual response to that prompt.

Figure 4:
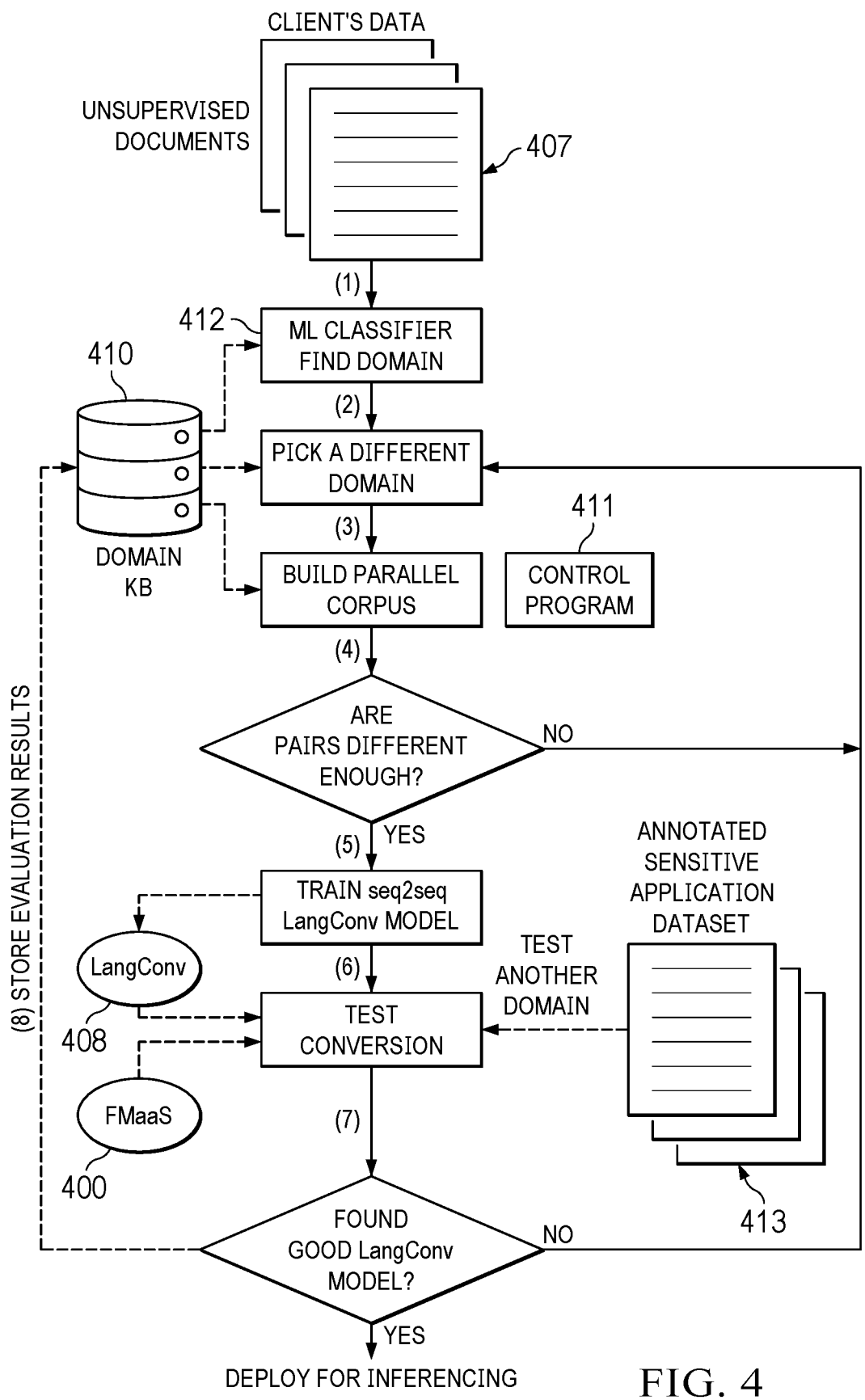
FIG. 4 depicts a technique for training a language conversion model to facilitate the domain adaptation-based prompt disguise inferencing of this disclosure.

FIG. 4 depicts a technique to create the language conversion model that is later used for inferencing (preferably in real-time) to facilitate the domain adaptation-based disguising of prompts according to this disclosure. As in the FIG. 3 example, the conversion language model creation here also preferably leverages the FMaaS 400, which is accessed by clients. The FMaaS 400 executes on a server, and the language converter model 408 that is created here will later be used for inferencing. i.e., to provide the prompt domain adaptation, as has been described. Thus, the model creation and validation workflow depicted in FIG. 4 is carried out in advance and under the control of one or more model training programs, such as a control program 411, typically as a set of computer program instructions executed in one or more processors of a computing system such as described above and depicted in FIG. 1. In addition, and in this embodiment, the solution also leverages a domain knowledge base 410. In particular, the domain knowledge base 410 is assumed to contain data explicitly associated to a set of domains. In this embodiment, the model creation workflow then proceeds as follows.

At step (1), the input client's data (which may be composed of a set of unsupervised documents) is used to correlate the client's data 407 to a domain of the set of domains that exist in the domain knowledge base 410. To that end, and in one approach, a machine learning classifier 412 is used for this purpose. The machine learning classifier is trained either on the domain data in the knowledge base 410 or with dataset similarity metrics. In a variant approach, the correlation (of input client data-to-domain) may be carried out using other non-ML-based approaches, such as by statistical analysis, direct look-up, or the like, or it may just proceed randomly. Step (1) thus finds or identifies a domain into which the client's data will be adapted to facilitate the privacy preservation during subsequent inferencing against the FMaaS 400. Thus, at step (2), the system picks the domain that is different from the domain found in the client's data.

The process then continues at step (3) by building a parallel corpus in the domain found at step (2) based on the client's data. Step (3) can be carried out, e.g., by searching for pairs with high similarity scores using a semantic similarity metric. A parallel corpora building method may be used for this purpose. By way of background, consider two disjoint sets of textual data $X^1 = \{x_0^1, \ldots, x_N^1\}$ and $X^2 = \{x_0^2, \ldots, x_M^2\}$, with N and M samples, related to two distinct styles $\tau_1$ and $\tau_2$, respectively. The task of creating a parallel corpus consists of creating a third set, namely $\overline{X}^{1,2} = \{\ldots, (x_i^1, x_j^2), \ldots\}$, where $1 \leq i \leq N$, $1 \leq j \leq M$, and $x_i^1$ has been found to be semantically similar to $x_j^2$ according to some similarity metric $\Psi$. One way to implement this is as follows; initialize $\overline{X}^{1,2}$ as an empty set. Then, by iterating in the samples of one set, compute each sample against all samples in the other set, adding a new pair in $\overline{X}^{1,2}$ comprising the current sample in the iteration and its correspondingly most similar one from the other set. More formally, for each $x_i^1 \in X^1$, compute the semantic similarity $\psi_{i,j}$ to each $x_j^2 \in X^2$, which results in the set $\Psi_i^1 = \{\psi_{i,0}^1, \ldots, \psi_{i,M}^1\}$. Next, include in $\overline{X}^{1,2}$ the new pair $(x_i^1, x_j^2)$, where $j = \text{argmax}(\Psi_i^1)$. Because one cannot rely on the assumption that each pair $(x_i^1, x_j^2)$ are actually parallel samples, a post-filtering is applied on $\overline{X}^{1,2}$ considering two thresholds, i.e., $\theta_{min}$ and $\theta^{max}$. To compute semantic similarity, a transformer neural network trained on various sources of data as a seq2seq model may take into account sentence embeddings (such as Universal Sentence Encoders (USE). Bidrectional Encoder Representations from Transformers (BERT), RoBERTa, and the like). After pre-processing, normalizing and tokenizing all samples in $X^1$ and $X^2$, a USE embedding vector (in one example embodiment) is computed for each of these samples, resulting in sets $V^1 = \{v_0^1, \ldots, v_N^1\}$ and $V^2 = \{v_0^2, \ldots, v_M^2\}$. As a consequence, and to compute the set of similarities $\Psi_i^1$, the Euclidean distance between the sentence embedding vectors in $V^1$ and $V^2$ is computed. The smaller the distance, the higher the similarity. While the above-described approach to creating the parallel corpus and (for subsequent training the seq2seq neural networks for style transfer) is preferred, other approaches (e.g., unsupervised methods) may be utilized as well.

Referring now back to FIG. 4, pairs created in step (3) are evaluated at step (4) to measure if they can meet an expected disguise level. This evaluation is carried out, for example, by setting one or more global metrics and pre-defined parameters that set an expected level of disguise for the system. This threshold preferably is configurable, and the threshold may be varied based on one or more factors such as described in a security or other policy. If the result of the evaluation is negative, then control returns back to step (2) to pick a different domain, in which case step (3) is then repeated as previously described. If, however, the result of the test at step (4) indicates that the domain selected at step (2) satisfies the expected disguise level, control continues at step (5) to train the language conversion model 408 using the parallel corpus that was built at step (3). In this example embodiment, the language conversion model is configured as a sequence-to-sequence (seq2seq) neural network. A framework for sequence-to-sequence (seq2seq) models is implemented in PyTorch and is publicly available (from pytorch.org). Without intended to be limiting, one preferred approach to implementing the language conversion model is as a transformer that has an encoder-decoder structure and, in particular, where the encoder maps an input sequence of symbol representations to a sequence of continuous representations. Given the continuous representations, the decoder then generates an output sequence of symbols. The techniques herein are not limited to use of transformer architectures. Other model architectures that may leverage the domain adaptation-based approach here include, for example, Generative Adversarial Networks (GANs), and Recurrent Neural Networks (RNNs)-based language models.

In an preferred embodiment, the language conversion model 408 is LangConv, implemented as a transformer using stacked self-attention and point-wise, fully-connected layers for both the encoder and the decoder. Attention is a mechanism that provides significant performance gains of deep neural network models in many visual, NLP and multimodal tasks. Specifically, attention scores over input regions or intermediate features are interpreted as a measure of the contribution of the attended element to the model inference. A self-attention mechanism maps a vector-based query and a set of vector-based key-value pairs to a vector-based output that is a weighted sum of the values, and where weights assigned to each value is computed by a compatibility function of the query with the corresponding key. A multi-head attention mechanism involves performing the self-attention mechanism in parallel, which yields a set of output values that are concatenated and used to produce final values.

In the LangConv architecture, the encoder is composed of a stack of identical layers, with each layer having two sub-layers. The first sub-layer is a multi-head, self-attention layer, and the second is a position-wise fully connected feed forward network. A residual connection is employed around each sub-layer, and the output of each sub-layer is then normalized. The decoder portion also is composed of a stack of identical layers. In addition to the two sub-layers, in the decoder a third sub-layer is used to perform multi-head attention over the output of the encoder stack.

Referring back to FIG. 4, preferably the language conversion model 408 is tested at step (6). In particular, here an annotated sensitive application dataset 413 (i.e., a dataset that includes client data that an organization desires to maintain private) is run through the trained language conversion model 408, and the resulting disguised prompts then being submitted to the FMaaS 400. Based on the disguised responses that are returned from the FMaaS, a test is performed at step (7) to determine whether the language conversion model has an expected accuracy level. The accuracy level is configurable, once again possibly based on a security or other policy or metric of interest. When the outcome of the test at step (7) indicates that the language conversion model has the expected level of accuracy (or other metric of interest), the training ends. On the other hand, if the outcome of the test at step (7) indicates that the language conversion model 408 does not have the expected accuracy level, control is returned either to step (2) (to pick another domain). As also indicated at step (8), preferably the evaluation results (i.e., the disguised results generated with respect to the disguised prompts) are saved back to the domain knowledge base 410, in effect as "cached" responses that may be later used during inferencing (instead of having to be created on-the-fly. This completes the description of the model creation and validation.

Summarizing, the preferred disguising process herein is based on a language conversion model that is trained using data retrieved from the language model as a service. This data preferably is collected through directed interaction with the language model as a service. The collected data is then domain labelled and has semantic features extracted. These semantic features are used to align content from different domains that are saved into a database. The content of the database is used to train the language conversion models. In operation, and during inferencing, when a client application submits a request to the model as a service, the original content is transformed into a content of a different domain using the language conversion model. Preferably, the most appropriate language conversion model is chosen based on the domain of the original content. The modified content along with a prompt is then submitted to the language model as a service. The response from the service is received and converted back to the original domain using the same language converter model.

Thus, once it is trained, the language conversion model is placed into service to facilitate the domain adaptation-based FMaaS inferencing depicted in FIG. 3 and described above. From time-to-time, or as client's data is updated or the like, the language conversion model is re-trained, re-validated, and re-instantiated into the FMaaS workflow. Typically, there may be multiple language conversion models created in the above-described process, wherein a particular language conversion model is associated with a particular domain of the original content.

Figure 5:
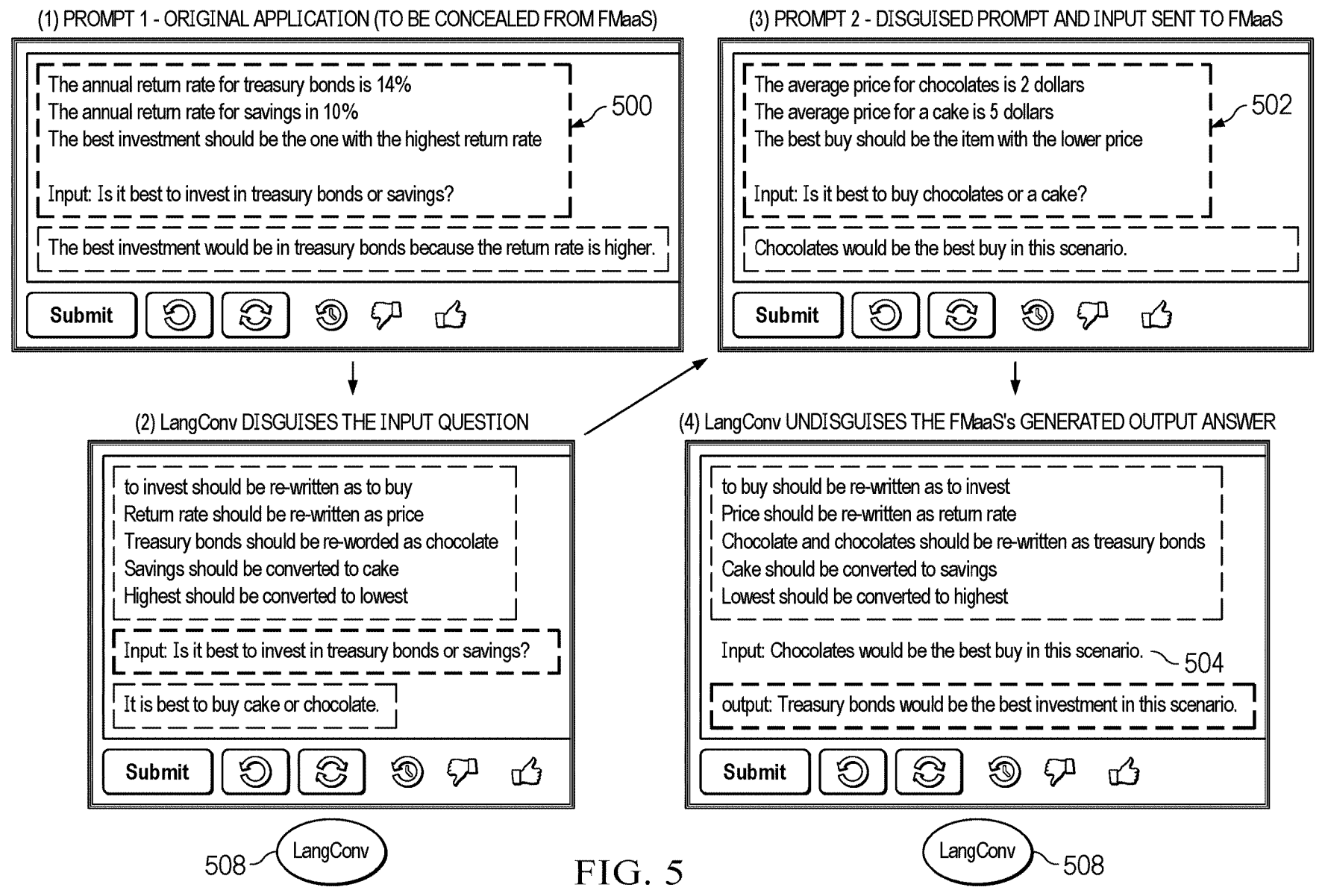

FIG. 5 depicts the operation of the above-described method and system using the Open AI ChatGPT-3 generative model for illustrative purposes only. In this example, it is assumed that the language conversion model 508 has been pre-trained in the manner described above with respect to FIG. 4. In this example, and at step (1), the original, local prompt 500 is entered at the client application, e.g., in a display panel. In this example, the prompt comprises a set of statements ("The annual return rate for treasury bonds in 14%." "The annual return rate for savings is 10%." and "The best investment method should be the one with the highest return rate." and the input to the LLM is "Is it best to invest in treasury bonds or savings?" If this client data is input to the LLM, the response is "The best investment would be in treasury bonds because the return rate is higher." Both the query and the response, however, exposes private information. e.g., a client's financial planning strategy. To mask the client's intent, the prompt is run through the language conversion model 508, which (based on the training described in FIG. 4) re-writes "invest" to "buy." "return rate" as "price," "treasury bonds" as "chocolate," "savings" to "cake." and "highest" to "lowest." Thus, the input ("Is it best to invest in treasury bonds or savings?") is then converted into the alternative domain ("It is best to buy cake or chocolate?"). This is step (2). At step (3), the modified prompt 502, disguised by language converter, is provided to the FMaaS. The modified prompt thus includes a set of statements ("The average price for chocolate is 2 dollars," "The average price for a cake is 5 dollars," and "The best buy should be the item with the lower price") that disguise the client's intent, and that result in the disguised input ("Is it best to buy chocolates or a cake?). Natively, the FMaaS returns the disguised result 504, namely that "Chocolates would be the best buy in this scenario. At step (4), that disguised result is then re-applied through the language conversion model 508, which produces the generated output. e.g., "Treasury bonds would be the best investment in this scenario."

Figure 6:
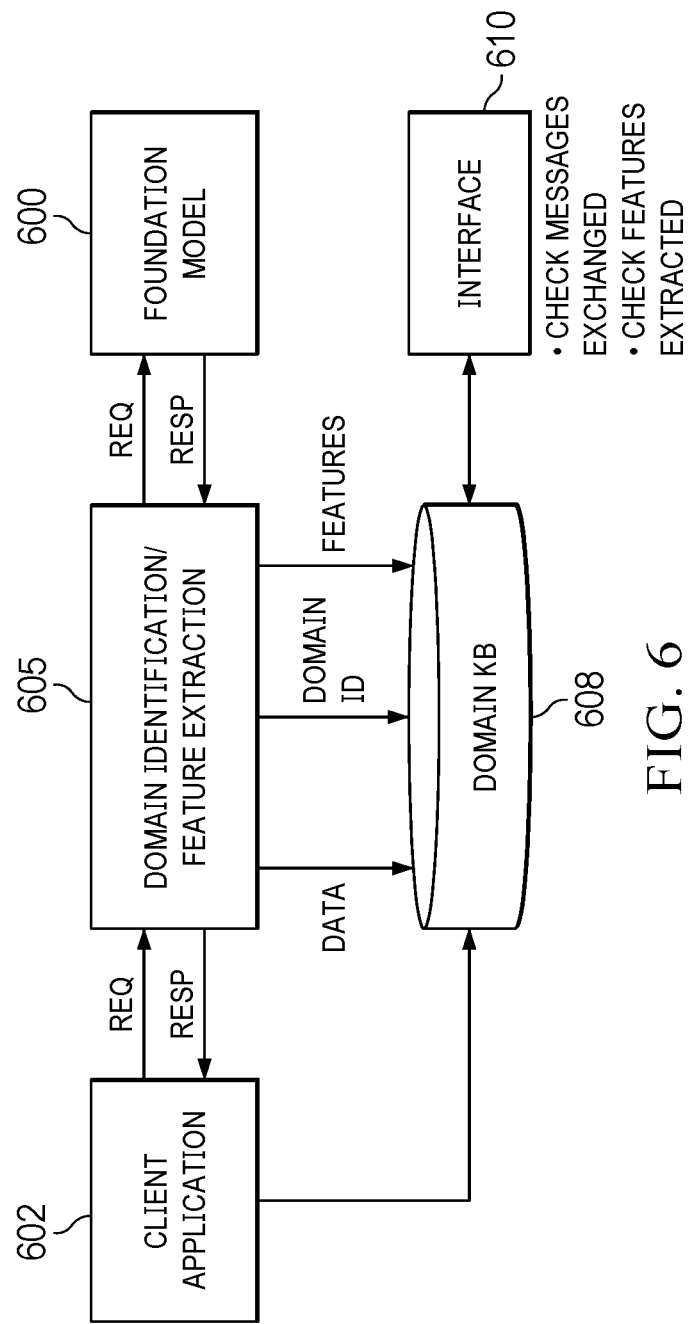
FIG. 6 depicts a representative technique for domain data collection that is used to populate a domain knowledge base for use in training the language conversion model.

With reference now to FIG. 6, a domain data collection technique for populating the domain knowledge base is depicted. As noted above with respect to FIG. 4, data in the domain knowledge base in used to train the language conversion model, and there may be multiple such models. As has also been described, preferably the domain knowledge base is populated by client interactions with the foundation model itself, as is now described in one example embodiment. As depicted, the foundation model 600 is executing as a service. The service is accessed by a client application 602, which can be a real application like a chatbot, a domain data collection application, or the like. The client application 602 is configured to direct the data collection from the foundation model 600 to produce aligned content for multiple domains. Thus, in the example embodiment, the client sends a request with a same intent for different domains. The responses that are returned from the foundation model are then annotated, e.g., as being equivalent (and each for a particular domain), by a domain identification/feature extraction component 605 that executes as an intermediary process between the client application 602 and the FMaaS 600. Thus, in this example, the following four (4) domains may be identified by the client application 602 querying the FMaaS 600 and found to be interchangeable for purposes of disguising a client's private data: sports (what are the characteristics of a good soccer player?); financial (what are the attributes of a good investment?); automotive (what are the features of a good car?); and education (what are the characteristics of a good school?). To this end, each of these domains is associated with a domain identifier (domain ID), the domain data (as identified in the statements), and one or more domain features as identified by the component 605, and this information is saved in the domain knowledge base 608 and available in an interface 610 to the rest of the language conversion model creation components. The particular semantics of domains that the system founds may be substituted for one another are not a limitation of the disclosure. The particular type and nature of the domain substitution will depend on the client's domain of interest, and the degree of sensitivity surrounding the private data that is sought to be protected from view. As a variant to this data collection approach, which leverages the FMaaS 600 directly, an organization may populate the knowledge base with data constructs that are semantically-similar, irrespective of how collected.

The above-described technique provides significant advantages. Foremost, the approach herein ensures privacy in a Foundation Model as a service (FMaaS) context, namely by providing a system and method that does not expose original user content when a user accesses a language model as a service. As has been described, the approach herein disguises the content of a request to a language model by converting the original content into semantic similar content but of a different domain. The response from the language model is in turn converted back to the domain of the original request. In this way the original request can be fulfilled by the language model without ever seeing the original content. The techniques herein transform a prompt so that the original content (e.g., textual data and instruction) cannot be discovered, even by people who speak the language in which the prompt is written. The solution is privacy-preserving, but it is carried out in a manner that does not impact the accuracy of the AI itself. The techniques herein thus provide a way to privately transfer personal or sensitive data to a large language model configured as a service without exposing the content. This solution enables an end user to safely leverage LLMs as a service by conveniently disguising the user's input prompts via domain adaptation. During use, the foundation/language model as a service only receives a disguised version of the input data, further ensuring that the model itself cannot be trained on the user's private data. The approach herein has the further advantage of preserving privacy without requiring any access to the underlying details of the foundation model itself.

Although not required, preferably the FMaaS uses Secure Sockets Layer (SSL) (or Transport Layer Security (TLS)) for secure connections between the client and the server, and the connection is verified against a local certificate to ensure authentication, integrity, and confidentiality.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

In a representative embodiment, the above-described ransomware mitigation system functions are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, FMaaS-based solutions, as well as improvements to the operational capabilities of such systems when used in the manner described.

The nature of the data that is the subject of a client query to the FMaaS is dependent on the application and is not intended to be limited. Example data types include financial, medical, genomic, enterprise data, other proprietary, confidential or sensitive data, measurement data, testing data, and so forth.

As used herein, a Foundation Model as a service (FMaaS) is intended to describe any machine learning model that is accessible via a Software-As-A-Service (SaaS) operational model. While the described approach provides significant advantages in the context of a generative AI (e.g., large language) model, the techniques herein (providing a language converter to convert between two domains, and using sequence-to-sequence conversion for masking inputs) may be applied in service scenarios involving domain-specific models as well. Thus, the techniques herein should be deemed applicable to any language "model as a service" offering.

The privacy-preserving method of this disclosure may itself be offered as a service, as an adjunct to an existing FMaaS, in some hybrid service delivery model, or otherwise.

Preferably, the language conversion model is implemented and run in a private environment to facilitate the privacy-preserving techniques herein.

While the approach herein has been described in the context of disguising prompts to language models, the notion of disguising the input prompt in the manner described may also be used with other types of models, such as a generative AI image model. In this variant, the input prompt used to generate the image (from the model) is disguised as described, and the resulting image returned from the model then converted back to the desired domain. The main pipeline of the above-described subject matter could be applied for this use case, needing only to implement an image domain converter instead of a language converter, to convert the resulting generated image from the disguised domain to the original one. To implement this variant embodiment, similar techniques such as transformer-based encoder decoders, RNNs, GAN, and the like, can be employed.

Having described the subject matter, what is claimed is as follows:

1. A privacy-preserving method of accessing a model as a service, comprising:
   receiving an input prompt authored in a first domain, the first domain including data intended to be maintained private;
   responsive to receipt of the input prompt, and using a conversion model that is distinct from the model as a service, converting the input prompt authored in the first domain to a second domain to create a converted input prompt, the converted input prompt preserving a semantic context of the input prompt;
   in lieu of providing the input prompt authored in the first domain to the model as a service, providing the converted input prompt;
   receiving from the model as a service a response to the converted input prompt, the response being in the second domain;
   responsive to receipt of the response, and using the conversion model, converting the response back into the first domain to create a converted response, the converted response having the semantic context of the input prompt; and
   providing the converted response as a reply to the input prompt.

2. The method as described in claim 1, further including training the conversion model.

3. The method as described in claim 2, wherein the conversion model is trained using data collected from user interactions with the model as a service.

4. The method as described in claim 2, further including selecting the second domain from one or more domains other than the first domain.

5. The method as described in claim 2, wherein the conversion model is a language conversion model, and wherein training the language conversion model includes:
   building a parallel corpus between data found in the first domain and data found in the second domain;
   evaluating whether the parallel corpus satisfies a given threshold; and
   when the parallel corpus satisfies the given threshold, training the language conversion model to learn the parallel corpus.

6. The method as described in claim 5, further including validating the language conversion model against a labeled dataset of private data prior to deploying the language conversion model for inferencing in association with the model as a service.

7. The method as described in claim 1, wherein the model as a service is deployed as one of: a language model, and an image model.

8. An apparatus, comprising:
   a processor;
   computer memory holding computer program instructions executed by the processor to enable privacy-preserving access to a model as a service, the computer program instructions comprising program code configured to:
   receive an input prompt authored in a first domain, the first domain including data intended to be maintained private;
   respond to receipt of the input prompt, and using a conversion model that is distinct from the model as a service, convert the input prompt authored in the first domain to a second domain to create a converted input prompt, the converted input prompt preserving a semantic context of the input prompt;
   in lieu of providing the input prompt authored in the first domain to the model as a service, provide the converted input prompt;
   receive from the model as a service a response to the converted input prompt, the response being in the second domain;
   respond to receipt of the response, and using the conversion model, convert the response back into the first domain to create a converted response, the converted response having the semantic context of the input prompt; and
   provide the converted response as a reply to the input prompt.

9. The apparatus as described in claim 8, further including program code configured to train the conversion model.

10. The apparatus as described in claim 9, wherein the conversion model is trained using data collected from user interactions with the model as a service.

11. The apparatus as described in claim 9, wherein the conversion model is a language conversion model, and wherein the program code configured to train the language conversion model further includes program code to select the second domain from one or more domains other than the first domain.

12. The apparatus as described in claim 11, wherein the program code configured to train the language conversion model further includes program code configured to:
   build a parallel corpus between data found in the first domain and data found in the second domain;
   evaluate whether the parallel corpus satisfies a given threshold; and
   when the parallel corpus satisfies the given threshold, train the language conversion model to learn the parallel corpus.

13. The apparatus as described in claim 12, further including program code to validate the language conversion model against a labeled dataset of private data prior to deploying the language conversion model for inferencing in association with the model as a service.

14. The apparatus as described in claim 8, wherein the model as a service is deployed as one of: a language model, and an image model.

15. A computer program product in a non-transitory computer readable medium, the computer program product holding computer program instructions that, when executed by a processor in a host processing system, enable privacy-preserving access to a model as a service, the computer program instructions comprising program code configured to:
   receive an input prompt authored in a first domain, the first domain including data intended to be maintained private;
   respond to receipt of the input prompt, and using a conversion model that is distinct from the model as a service, convert the input prompt authored in the first domain to a second domain to create a converted input prompt, the converted input prompt preserving a semantic context of the input prompt;

in lieu of providing the input prompt authored in the first domain to the model as a service, provide the converted input prompt;

receive from the model as a service a response to the converted input prompt, the response being in the second domain;

respond to receipt of the response, and using the conversion model, convert the response back into the first domain to create a converted response, the converted response having the semantic context of the input prompt; and provide the converted response as a reply to the input prompt.

16. The computer program product as described in claim 15, further including program code configured to train the conversion model.

17. The computer program product as described in claim 16, wherein the conversion model is trained using data collected from user interactions with the model as a service.

18. The computer program product as described in claim 16, wherein the conversion model is a language conversion model, and wherein the program code configured to train the language conversion model further includes program code to select the second domain from one or more domains other than the first domain.

19. The computer program product as described in claim 18, wherein the program code configured to train the language conversion model further includes program code configured to:

build a parallel corpus between data found in the first domain and data found in the second domain;

evaluate whether the parallel corpus satisfies a given threshold; and when the parallel corpus satisfies the given threshold, train the language conversion model to learn the parallel corpus.

20. The computer program product as described in claim 19, further including program code to validate the language conversion model against a labeled dataset of private data prior to deploying the language conversion model for inferencing in association with the model as a service.

* * * * *